United States Patent
Ono et al.

(10) Patent No.: US 7,354,964 B2
(45) Date of Patent: Apr. 8, 2008

(54) METHOD AND APPARATUS FOR PRODUCING DOPE

(75) Inventors: Seiichi Ono, Kanagawa (JP); Yuji Suzuki, Kanagawa (JP); Hidekazu Yamazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 511 days.

(21) Appl. No.: 10/901,030

(22) Filed: Jul. 29, 2004

(65) Prior Publication Data

US 2005/0043444 A1    Feb. 24, 2005

(30) Foreign Application Priority Data

Jul. 30, 2003    (JP)    ............................. 2003-282937

(51) Int. Cl.
  *B01F 3/08*    (2006.01)
(52) U.S. Cl. ...................................... 523/346; 523/303
(58) Field of Classification Search ................ 523/346, 523/303
See application file for complete search history.

(56) References Cited

U.S. PATENT DOCUMENTS 6,974,608 B2 *    12/2005    Shimizu et al. ............ 428/1.33

OTHER PUBLICATIONS

Japan Institute of Invention and Inovation (JIII) Journal of Technical Disclosure; No. 2001-1745; Issued Mar. 15, 2001; pp. 1-84.

* cited by examiner

*Primary Examiner*—Edward J. Cain
(74) *Attorney, Agent, or Firm*—Birch, Stewart, Kolasch & Birch, LLP (57) ABSTRACT

The mixture solvent of dichlorimethane type, the TAC and the plasticizer are supplied into a dissolution tank, and stirred therein with a stirrer to obtain a dispersing solution. The dispersing solution is fed into a storing tank and further stirred therein. Then the dispersing solution is fed by a pump to a heat exchanger for the heating, and thereafter the stirring is made with a static mixer. The temperatures of the dope is measured at many measuring points. On the basis of the temperature distribution, the heat transmission conditions of the heat exchanger are adjusted. Then the dope is fed to a heat exchanger for cooling, to cool to at most the normal boiling point of the dope. Then the mixing is made with a static mixer. Thus the obtained dope is uniform.

22 Claims, 8 Drawing Sheets

METHOD AND APPARATUS FOR PRODUCING DOPE

This Nonprovisional application claims priority under 35 U.S.C. § 119(a) on patent application Ser. No(s). 2003-282937 filed in Japan on Jul. 30, 2003, the entire contents of which are hereby incorporated by reference.

BACKGROUND OF THE INVENTION

1. Field of the Invention

The present invention relates to a method and an apparatus for producing a dope used in a solution casting method.

2. Description Related to the Prior Art

A TAC film formed of cellulose acylate, especially of cellulose triacetate (hereinafter TAC) whose averaged acetylation degree is 57.5% to 62.5% has high strength and inflammability, and is therefore used as a film base of photosensitive materials and the like. Further, as excellent in optical isotropy, the TAC film is used for an optical compensation film, a protective film of a polarizing filter in a liquid crystal display whose market becomes larger recently.

The TAC film is usually produced by a solution casting method, in which the produced film has more excellent physical property (optical properties and the like) than other methods, such as a melt extrusion method. In order to obtain the TAC film in the solution casting method, a polymer solution (hereinafter dope) is produced by dissolving the TAC to a mixture solvent, while a main solvent of the mixture solvent is dichloromethane, methyl acetate or the like. The dope is cast with a casting die onto a smoothly brushed up metallic substrate (or support) to form a casting film. The casting film having a self-supporting property is peeled from the metallic substrate and transferred by a tenter device and a roller drying device with drying.

The dissolubility of the TAC to the solvent is not high. Accordingly, when the dope is produced with use of TAC as the polymer, the production of the dope is hard. Therefore after the TAC is added to the solvent to obtain a dissolving solution (or a rough solution), the dissolving solution is heated and cooled for producing the dope. When the heating and the cooling are made, it is preferable to use a heat exchanger, especially a spiral type heat exchanger. Further, when the dissolution is not made enough, the heating and the cooling are refrained to increase the dissolubility. Further, a temperature gauge may be provided downstream from the heat exchanger to measure the temperature of the solution, and the temperature is regulated by changing the heat transmission conditions of the heat exchanger on the basis of the measured temperature. (For example, Japan Institute of Invention and Innovation (JIII) Journal of Technical Disclosure No.2001-1745).

However, when the dope or the dissolving solution has a temperature distribution, there may be problems in the progress of the dissolution. Further in this case, as the dissolving solution or the dope has the difference of the physical property, especially viscosity, a drift occurs in the dope or the dissolving solution. Thus the uniform heating and cooling becomes hard, and the heating and cooling abilities of the dope producing equipment cannot be enough. Especially, when the heating or cooling is made suddenly, the heat transmission from the transmitting medium to the dissolving solution or the dope cannot be made enough and the temperature distribution easily occurs. Further, when the drift of the dope occurs in the heat exchanger, the drift remains in pipes, and the measured temperature changes depending on position of the measurement. Even though the temperature is incorrectly measured, the adjustment of the heating conditions is made on the basis of the measured values. In this case, the temperature distribution occurs.

Further, it is preferable to keep the pressure to the dope or the dissolving solution higher than the vapor pressure at the highest temperature, while the heating is made. Otherwise, bubbles of the solvent are generated to disturb the dissolution. Further, in this case, the solute, especially the polymer, is solidified in the evaporation of the solvent, and the generated solids materials often occludes the heat exchanger. Further, the solid materials are mixed as foreign materials into the dope.

SUMMARY OF THE INVENTION

An object of the present invention is to provide a method and an apparatus for producing a dope uniformly by regulating a temperature distribution of the dope at an exit of a heat exchanger.

An another object of the present invention is to provide a method for producing a dope, in which the measurement accuracy of the temperature of the dope is improved.

A still another object of the present invention is to provide a method of producing a dope, in which the generation of bubbles is reduced.

A still another object of the present invention is to provide a method of producing a dope which is used in a solution casting method for producing a film excellent in optical properties.

In order to achieve the above objects and other objects, a method of producing a dope by dissolving a polymer into a solvent includes steps of heating a dissolving solution of the polymer and the solvent with use of a heater, and stirring the dissolving solution with use of a stirrer after the heating.

The preferable embodiment of the method of the present invention further includes steps of cooling the dope to at most a normal boiling point of the solvent with use of a cooling apparatus after the stirring, and stirring again the cooled dope with an stirring apparatus.

The present invention has the following structure:

(1) A static mixer is provided as a mixing device downstream from a heat exchanger so as to make the stirring the dope after the temperature adjustment;
(2) The temperature is gradually increased or decreased with use of plural heat exchanger;
(3) The temperatures of the dope while being fed are measured at several points in a vertical section of a feeding pipe with use of resistance thermometer having plural measurement points, and the heat transmission conditions of the heat exchanger are adjusted;
(4) The pressure to the dope is regulated to prevent the generation of bubbles.

According to the present invention, as the static mixer is provided in downstream from the heat exchanger for the heating, the uniform heat-dissolution of the dope is possible. Further, the heat exchanger for the cooling is used and an the static mixer is provided in the downstream from the heat exchanger. Accordingly, the cooling of the dope is made uniformly. As the heat exchangers for the heating and the cooling, spiral type heat exchangers are used. Therefore the heat transmission efficiency becomes good.

Further, plural units, each of which is constructed of a heat exchanger and a static mixer, are used to gradually increase or decrease the temperature in the range of 20° C. to 70° C. Accordingly, in the heat exchangers, the dope has the temperature distribution. The measurement of the temperature is made downstream from the static mixer, and on the basis of the result of the measurement, the heat transmission conditions of the heat exchanger are adjusted. Thus the accuracy of the temperature control of the solution in the heat exchanger is increased. Further, as the resistance thermometer having several measurement points is used, the temperature distribution is measured. Accordingly, the accuracy of the temperature adjustment of the heat exchanger is increased. Furthermore, in the present invention, the highest temperature T(° C.) of the produced dope is measured, and the pressure P(MPa) of the dope is larger than a theoretical value P0(MPa) of the vapor pressure at the highest temperature T(° C.). Accordingly, the generation of bubbles in the dope is prevented, and the occlusion of the heat exchanger and the mixing of the foreign materials in the dope are prevented.

An apparatus for producing a dope by dissolving a polymer into a solvent of the present invention includes a heater for heating a mixture of the polymer and the solvent, and a stirring device for stirring the heated mixture to obtain the dope.

In the method and the apparatus for producing the dope, as the generation of the temperature distribution is reduced, the uniformity of the obtained dope is extremely uniform. Accordingly, the optical properties of the film produced from the dope in the solution casting method has extremely excellent optical properties. Accordingly, the film is preferably used as the protective film of the polarizing filter, the optical compensation sheet and the like.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Polymers used in the present invention is not restricted especially. However, the preferable polymer is cellulose esters. In the cellulose esters, cellulose acylate is particularly preferable, and cellulose acetate is especially preferable. Further, in cellulose atetate, cellulose triacetate (TAC) whose acetylation degree is 57.5% to 62.5% is the most preferable. The acetylation degree means the substitution degree for acetyl group in the cellulose acylate. The measurement and calculation of the acetylation degree is made with ASTM:D-817-91 (testing method for cellulose acetate and the like).

In the present invention, the cellulose acylate particles may be used. At least 90 wt. % of the cellulose acylate particles has diameter from 0.1 mm to 4 mm, preferably from 1 mm to 4 mm. Further, it is preferable that the weight percentage of the cellulose acylate particles having diameter from 0.1 to 4 mm is preferably at least 95 wt. % of the total cellulose acylate particles, particularly at least 97 wt. %, especially at least 98 wt. %, and most especially at least 99 wt. %. Furthermore, it is preferable that at least 50 wt. % of the cellulose acylate particles have diameter from 2 mm to 3 mm. The weight percentage of the cellulose acylate particles having diameter from 2 mm to 3 mm is particularly at least 70 wt. %, especially at least 80 wt. %, and most especially at least 90 wt. %. Preferably, the cellulose acylate particle has a nearly ball-like shape.

Further, instead of the cellulose acylate particles, chip-like materials obtained by milling the film are preferably used. In this case, the effects for reducing the filtration pressure in removing the foreign materials become larger. The tips are obtained by cutting the side edge portions of the film in the trimming or the completed film roll.

As the solvent used in the present invention, there are halogenated hydrocarbons, esters, ketones, ethers, and the like. However they are not restricted especially. The purification of the solvents may be that in the market, and not restricted especially. Note that the one sort of the solvents may be used, namely 100 wt. % of the solvent. Otherwise the solvent of the dope may be a mixture solvent of the solvent materials alcohols, ketones, esters, ethers and the like with at most 6 carbon atoms. Concretely, in the halogenated hydrocarbon, there are dichloromethane and the like. In the esters, there are methyl acetate, methyl formate, ethyl acetate, amyl acetate, butyl acetate and the like. In ketones, there are acetone, methylethyl ketone, cyclohexanone and the like. In ethers, there are dioxane, dioxolane, tetrahydrofuran, diethylether, methyl-tert-butylether, and the like. Note that when a mixture solvent is used as the solvent, it is preferable to use dichloromethane or methyl acetate as the main solvent.

As additives to be added to the dope, there are plasticizers, UV-absorbing agents, matting agent, mold lubricant, surface activation agent (or surfactant) of fluoride type, release agent, deterioration inhibitor, retardation adjusters, oil-gelation agent, and the like. However, the additives are not restricted in them. Note that the additives may be added while the polymer is dissolved to the solvent, and otherwise added after the dissolution. Further, the solution in which the additives are dissolved to the solvents may be added to the solvent, the dope and the like. In this case, the addition is made in the batch manner, or the continuous addition may be made in the inline manner.

As the plasticizers, there are phosphate esters (for example, triphenyl phosphate (herein after TPP), tricresyl phosphate, cresyldiphenyl phosphate, octyldiphenyl phosphate, diphenylbiphenyl phosphate (hereinafter BDP), trioctyl phosphate, tributyl phosphate and the like), phthalate esters (for example, diethyl phthalate, dimethoxyethyl phthalate, dimethyl phthalate, dioctyl phthalate, and the like), glycolic acid esters (for example, triacetin, tributyrin, butylphthalylbutyl glycolate, ethylphthalylethyl glycolate, methylphthalylethyl glycolate, buthylphthalylbuthyl glycolate, and the like), and other plasticisers.

As the UV absorbing agents, there are, for example, oxybenzophenone based compounds, benzotriazol based compound, salicylic acid ester based compounds, benzophenone based compounds, cyanoacrylate based compounds, nickel complex salt based compounds, and other UV absorbing agents. Especially preferable ones are benzotriasol based compounds and benzophenone based compounds.

As the retardation adjusters, there are aromatic compounds having at least two aromatic rings, for example, compounds having at least one 1,3,5-triadine ring, compounds having the molecular structure in which a steric hindrance of the conformation between two aromatic groups does not occur.

Figure 1:
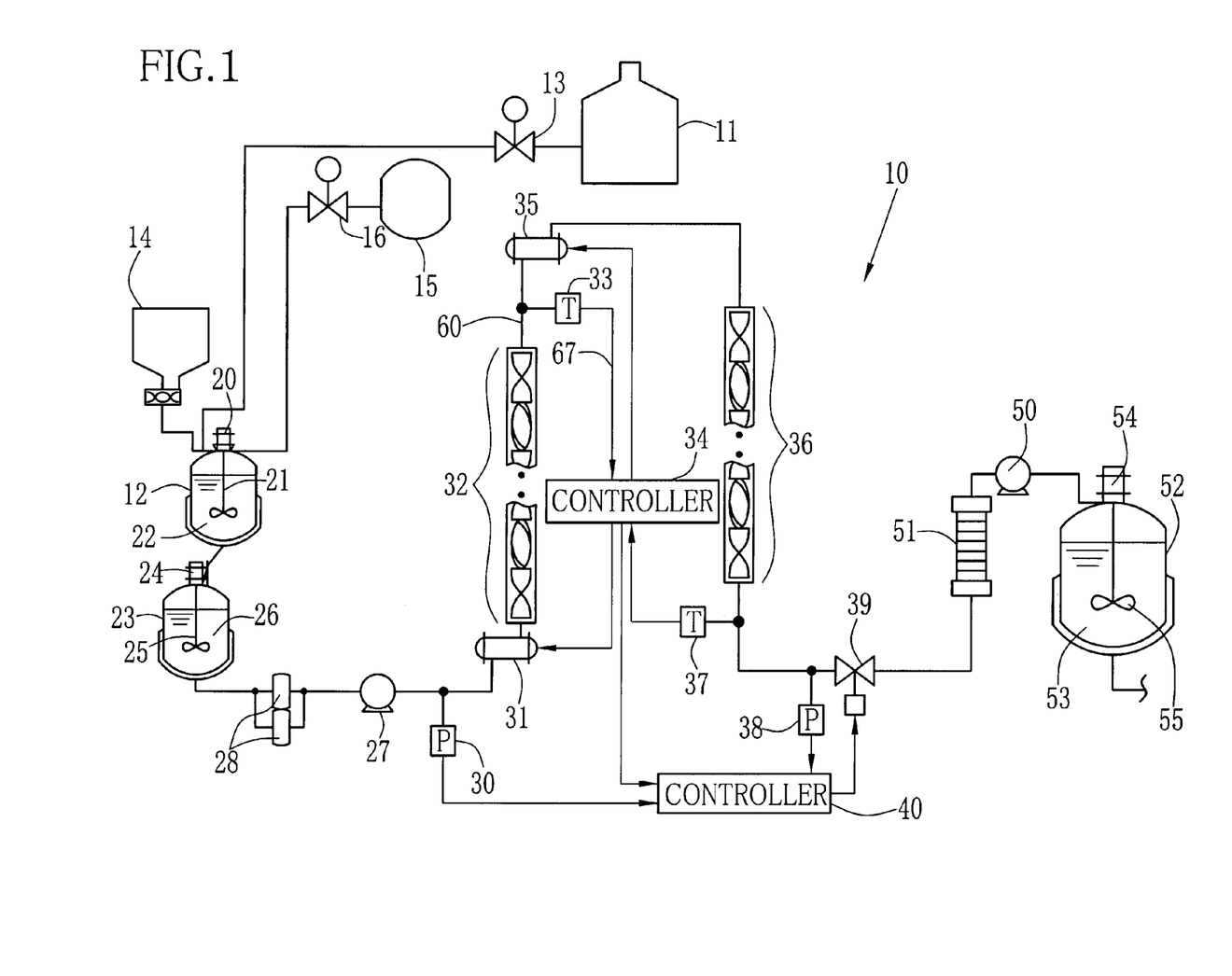
FIG. 1 is an explanatory view illustrating an embodiment of a method of producing a dope.

In FIG. 1 is illustrated a dope production line 10 to which the method of producing the dope of the present invention is applied. In the method of producing the dope, a predetermined amount of solvent is sent from a solvent tank 11 to a dissolution tank 12. (Note that the solvent in this application includes the mixture solvent). In the solvent tank 11, the solvent is contained. The solvent is fed, and thereby the flow rate is adjusted with use of a valve 13 provided between the solvent tank 11 and the dissolution tank 12. Note that when the feeding is made, a pump (not shown) may be used. Then the predetermined amount of the polymers in a hopper 14 is supplied with being measured. Note that the amount of the supplied polymer is preferably determined such that the concentration of the polymer in the dope may become in the range of 0.1 wt. % to 25.0 wt. %, and particularly in the range of 15.0 wt. % to 25.0 wt % to the solvent.

Further, the plasticiser solution is fed from a plasticiser tank 15 to the dissolution tank 12. Between the plasticiser tank 15 and the dissolution tank 12, there is a valve 16 for adjusting the flow rate of the supplied plasticiser solution. Further, a pump (not shown) may be used for feeding the plasticiser solution. Note that TPP, BDP or a mixture of them is preferably used as the plasticiser. However the sort of the plasticiser is not restricted especially. Note that the method of supplying the plasticiser into the dissolution tank 12 is not restricted in the above method of feeding the plasticiser solution. When the plasticiser is in the liquid state in the room temperature, the plasticiser may be supplied to the dissolution tank 12. When the plasticiser is in the solid state in the room temperature, the plasticiser may be supplied from a hopper. Note that the amount of the plasticiser to be supplied in the present invention is preferably in the range of 0.1 wt. % to 20 wt. %, and particularly 5.0 wt. % to 15.0 wt. % to the polymer. However, the amount of the plasticiser is not restricted in the above ranges.

In the above explanation, the solvent, the polymer, and the additives are supplied to the dissolution tank 12 in this order. In the present invention, however, the supplying order is not restricted in it. For example, after the polymer, the solvent may be supplied. Further, it is not always necessary to previously supply the plasticiser into the dissolution tank 12, and the plasticiser may be added in the following processes to a dissolving solution of the polymer and solvent or the dope. Note that in this embodiment there are two grade of the dissolving solutions dependent on the procedure of the process; dissolving solutions 22, 26. Further, the additives other than the plasticiser may be supplied to the dissolution tank 12.

The dissolution tank 12 is provided with a stirrer 21 which is rotated by a motor 20. The stirrer 21 is rotated to stir the solvent, polymer, plasticiser and the like in the dissolution tank 12, and the solute of the polymer and the like roughly dissolves to the solvent. Thus a dissolving solution 22 is obtained, in which the solute is usually not dissolved to the solvent yet. It is to be noted in the present invention that the almost of the solute may be dissolved to the solvent.

The dissolving solution 22 is fed to a store tank 23. After the dissolving solution 22 is obtained, the dissolution tank 12 is made empty, and thereafter the new dissolving solution 22 is prepared. This preparation method is called a continuous batch type, which has merit in cost. However, the present invention is not restricted in this method. The store tank 23 also includes a stirrer 25 which is rotated by a motor 24. The stirrer is rotated to stir and mix a dissolving solution 26 in the store tank 23.

After the pump 27 is driven to feed the dissolving solution 26 through a filtrating device 28, the pressure of the dissolving solution 26 is measured with a pressure gauge 30. Thereafter the dissolving solution 26 is fed to a heat exchanger 31 for the heating. Note that the filtrating device 28 is provided for removing impurities such as dusts and the like in the dissolving solution. However, the filtrating device 28 may be omitted. Note that the process described above is not restricted in the embodiment of FIG. 1. The processes for preparing the dissolving solutions 22, 26 are not always necessary. In order to produce the dope, the solvent, the polymer and the necessary additives are mixed to make the dissolution of the solute such as the polymer and the like to the solvent with use of the heat exchanger 31.

The heat exchanger explained above may be a spiral type heat exchanger, a multi-pipe (shell&tube) heat exchanger, a coil heat exchanger, an inline mixer such as double pipe static mixer and the like. However, the present invention is not restricted in them. Among them it is preferable to use the spiral type heat exchanger, as the occlusion of the flow path becomes harder and there may be a merit in the smaller size of the device and the cleaning. In the following explanation, the spiral type heat exchanger is used for each heat exchanger. Further, the preferable materials thereof are SUS316L, SUS317L, SUS317J, SUS836L, titanium, hastelloy (trade name) and the like, in view of the corrosion resistance. However, the materials are not restricted in them.

The dissolving solution 26 is heated with the heat exchanger 31 to dissolve the solute (especially polymer) to the solvent. The heating period is in the range of 5 minutes to 30 minutes, the heating temperature is preferably in the range of 50° C. to 150° C., and especially 60° C. to 120° C. When the heating period is less than 5 minutes, the progress of the dissolution of the solute to the solvent is not enough. Further, when the heating period is more than 30 minutes, the dissolution is almost completed in 30 minutes. Therefore the heating period is often too long, and the decomposition and the like of the solute and the solvent sometimes occurs. Further, when the heating temperature is less than 50° C., the dissolution of the solute to the solvent becomes harder. When the heating temperature is more than 150° C., and the decomposition and the like of the solute and the solvent sometimes occurs. Accordingly the heating temperature is preferably at most 120° C. Further, the heating temperature is above the boiling point of the dissolving solution 26 under the atmospheric pressure. When the heating is made without increasing the pressure such that the temperature may be above the boiling point, the dissolving solution 26 sometimes boils. In this case that the dope boils, different from the boiling in usual liquid, the solute (especially polymer) is solidified at position to which the solvent spatters, and it causes to occlude the heat exchanger. Further, it causes sometimes the stop or damage of the dope production line 10. The solidified polymer sometimes mixed into the dope. Note that in the following explanation, the boiling point under the atmospheric pressure is called a normal boiling point.

It is preferable to provide a mixing device downstream from the heat exchanger 31. The mixing device mixes the dissolving solution 26 to obtain a dope, and is not restricted especially. However it is preferable to use a static mixer 32 provided with baffles in a pipe. Note that the other mixing devices may be a square mixer, a Sulzer mixer and the like. The shape of the static mixer 32 is not restricted especially. However, when the flow rate of the dope is in the range of 30 L/min to 200 L/min, it is preferable that the diameter of the pipe is 50 mm-300 mm and the number of blades is 6-60. Note that the conformation of the static mixer will be explained below.

The temperature of the dope mixed in the static mixer 32 is measured by a temperature gauge 33. The explanation of the temperature gauge 33 is made in followings. The measured temperature data of the dope by the temperature gauge 33 is sent to a controller 34 for adjusting the heat transmission conditions, such as the flow rate, the temperature and the like of the heating medium in the heat exchanger 31.

The heated dope is sent to a heat exchanger 35 for the cooling. In the heating exchanger 35, the dope is cooled to the normal boiling point of the main solvent of the dope. Thereafter the mixing of the dope is made by the static mixer 36. Note that in the static mixer 36 it is preferable that the diameter of the pipe is in the range of 50 mm to 300 mm, and the number of the blades is 6-60. Thereafter, the temperature of the dope is measured by a temperature gauge 37 provided downstream from the static mixer 36. Note that the detailed explanation of the temperature gauge 37 is also made in followings. The measured temperature of the dope by the temperature gauge 37 is sent to the controller 34, which adjusts the cooling conditions, such as the flow rate and the temperature. Note that there is a pressure gauge 38 in the downstream side from the temperature gauge 37 and at a position at which the temperature of the dope becomes lower than the normal boiling point of the atmospheric pressure. Note that when plural static mixers are arranged in series, the temperature gauges 33, 37 may be provided between the static mixers.

The values of the pressures measured by the pressure gauges 30,38 are sent to a controller 40. Further, the temperature values measured by temperature gauges 33, 37 are sent from the controller 34 to the controller 40. When the highest temperature T(° C.) of the dope is in the range of 60° C. to 150° C., the pressure adjusting valve 39 is opened and closed such as the pressure P(MPa) may satisfy the following condition (1):

$$3.0(MPa) > P(MPa) \geq [P0 + (T-40) \times 0.002](MPa) \quad (1)$$

wherein P0(MPa) is a theoretical value of the vapor pressure that is calculated from the highest temperature of the dope above the normal boiling point. Note that the pressure P(MPa) may be at least 3.0 MPa. However, in this case, there are demerits in the cost as the feed pressure of the pump 27 becomes higher. Note that the maximal value of the pressure P is preferably at most 2.5 MPa, and especially at most 2.0 MPa. When the maximal value of the pressure P(MPa) becomes lower, the equipment of the lower endurance can be used to make the cost for equipment lower. Further, (T−40)× 0.002 is the lowermost value and such an additional value of the pressure that the bubbles may not be generated also when the heater (for example steam heater) moves.

The dope is fed to a filtrating device 51 by a pump 50. After the impurities are removed by the filtrating device 51, the dope is contained as a refined dope 53 in a dope tank 52. Also in the dope tank 52, a stirrer 55 connected to a motor 54 is provided. The stirrer 55 is rotated to stir the refined dope 53 uniformly.

Figure 2:
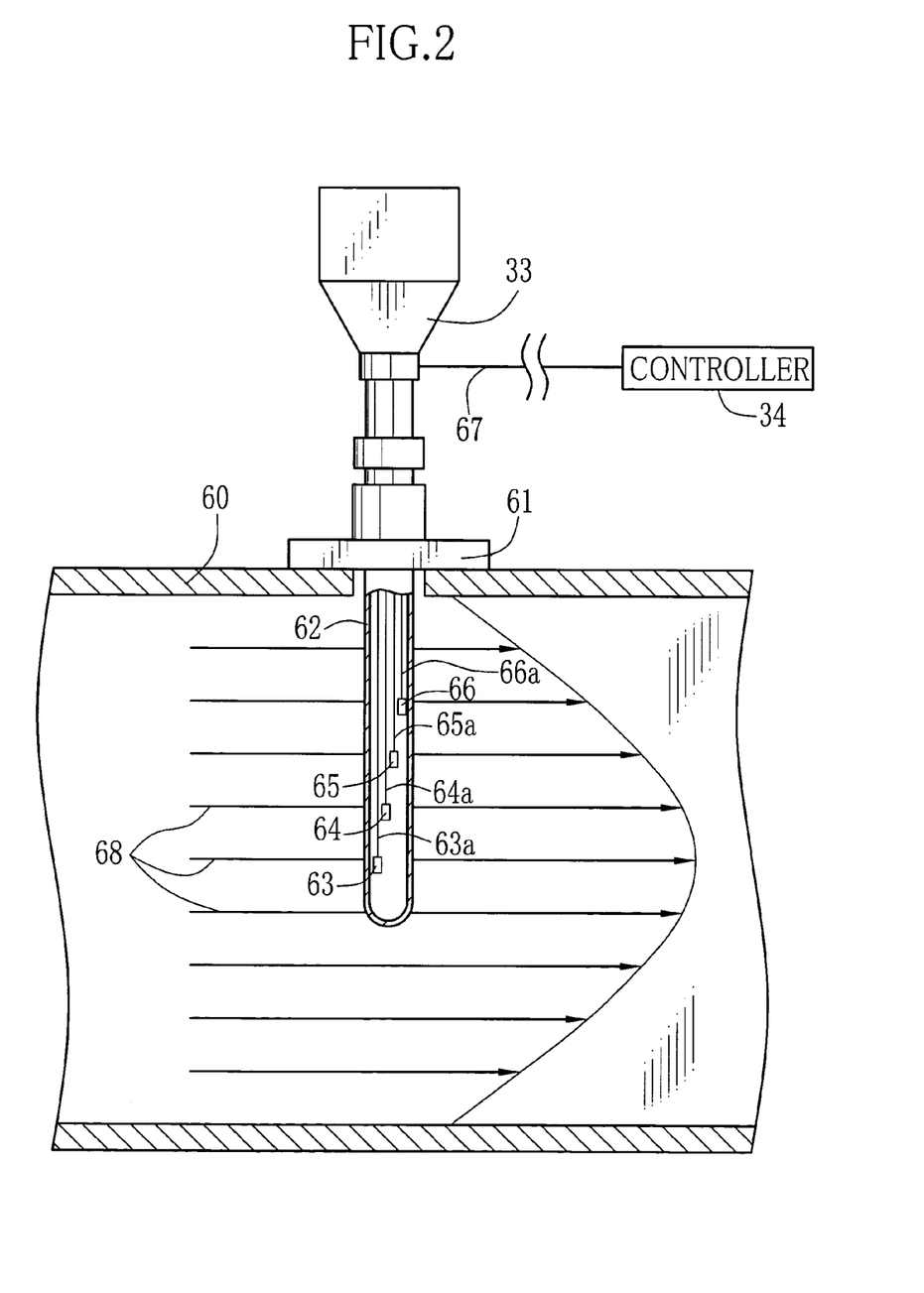
FIG. 2 is a sectional view of thermometer used in FIG. 1.

The temperature gauges 33, 37 used in the present invention will be explained in reference with FIG. 2. The temperature gauge 33 is attached with a flange 61 to a pipe 60 in which the dope is fed. In a protective pipe 62 of the temperature gauge 33, there are elements (or resistances) 63-66 which are connected to conductive wires 63a-66a. The conductive wires 63a-66a are connected through a conductive wire 67 to the controller 34. Note that each conductive wire 63a-66a connected to the respective element 63-66 is illustrated with one line for explanation. However, each of them may be a two wire type, a three wire type, or four wire type. In the present invention, it is preferably the three wire type.

The elements 63-66 measure the temperatures independently, and are resistance thermometers (or resistance thermodetectors) in which the electric resistance of metal becomes higher in accordance with the increase of the temperature. As the metal, platinum is preferable used, since temperature coefficient corresponding to the resistance is known in detail. However, other metals, alloys and the like can be used. The elements 63-66 independently measures at four positions the temperatures of a dope 68 in the preparation process that flows in the pipe 60. The temperature of each position is sent to the controller 34. The controller 34 calculates an averaged temperature and a temperature distribution of the four temperatures and a weighted average by taking into account of flow rate of the measured dope to the measured temperatures. Thus the measurement accuracy is improved. Therefore, even though the dope 68 has the temperature distribution, the measurement is accurately made, and the regulation of the heat exchanger 31 is made strictly. Note that the temperature gauge 37 preferably has the same structure as the temperature gauge 33 of FIG. 2.

Figure 3:
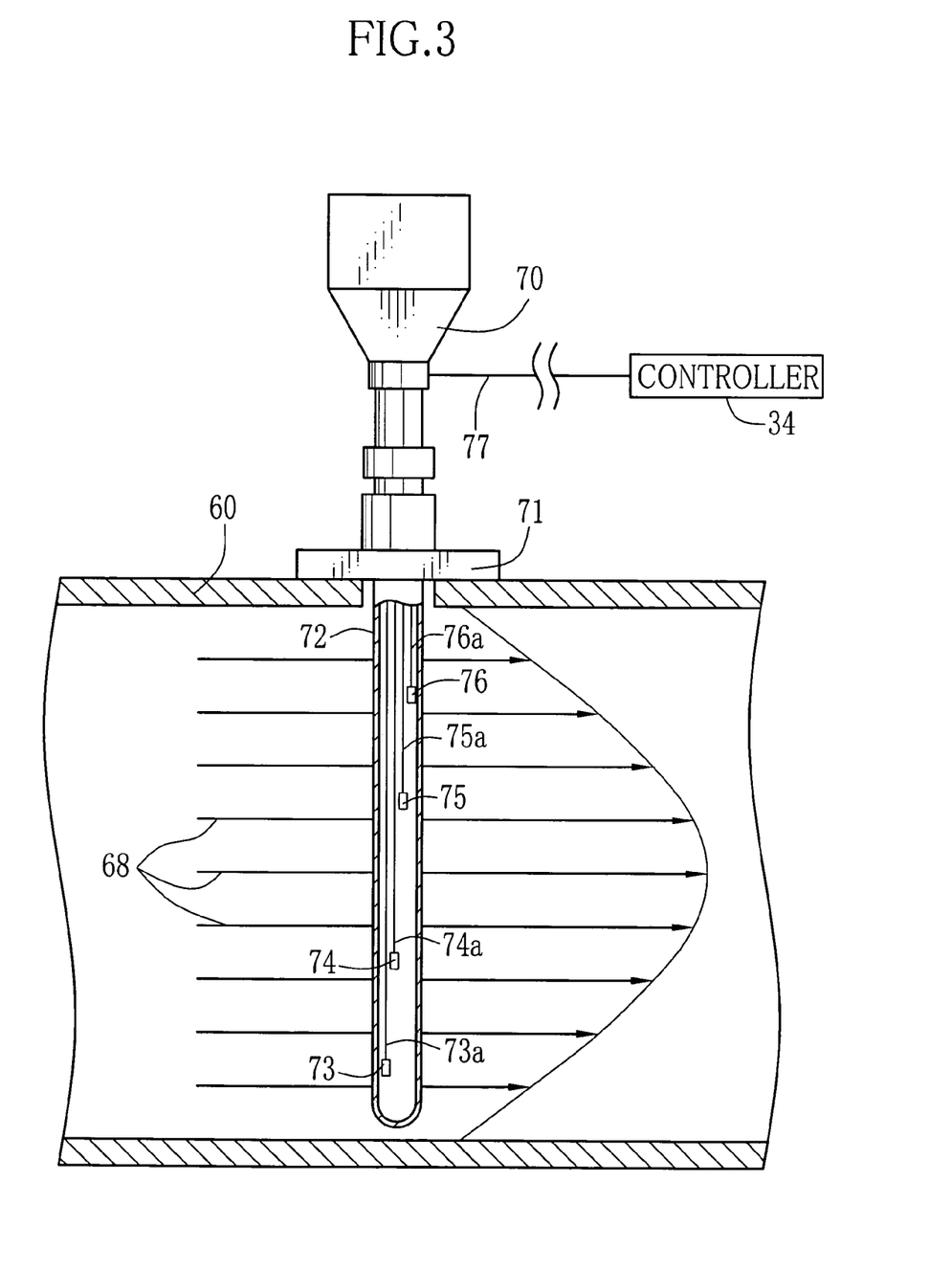
FIG. 3 is a sectional view of another embodiment of a thermometer used in FIG. 1.

In FIG. 3, a temperature gauge 70 is illustrated as other embodiment to explain. The explanation of the same members and structure is omitted. The temperature gauge 70 is attached to the pipe 60 with flange 71. In a protective pipe 72 of the temperature gauge 70, there are elements 73-76 which are connected to conductive wires 73a-76a. And the temperature gauge 70 is connected through a conductive wire 77 to the controller 34. The elements 73-76 are respectively disposed from an upper to lower side of the pipe 72 in this figure over the whole flux area of the dope. Note that the number of the elements in each of the temperature gauge 33, 70 is four. However, the number is not restricted in four, and may be at least two.

Figure 4:
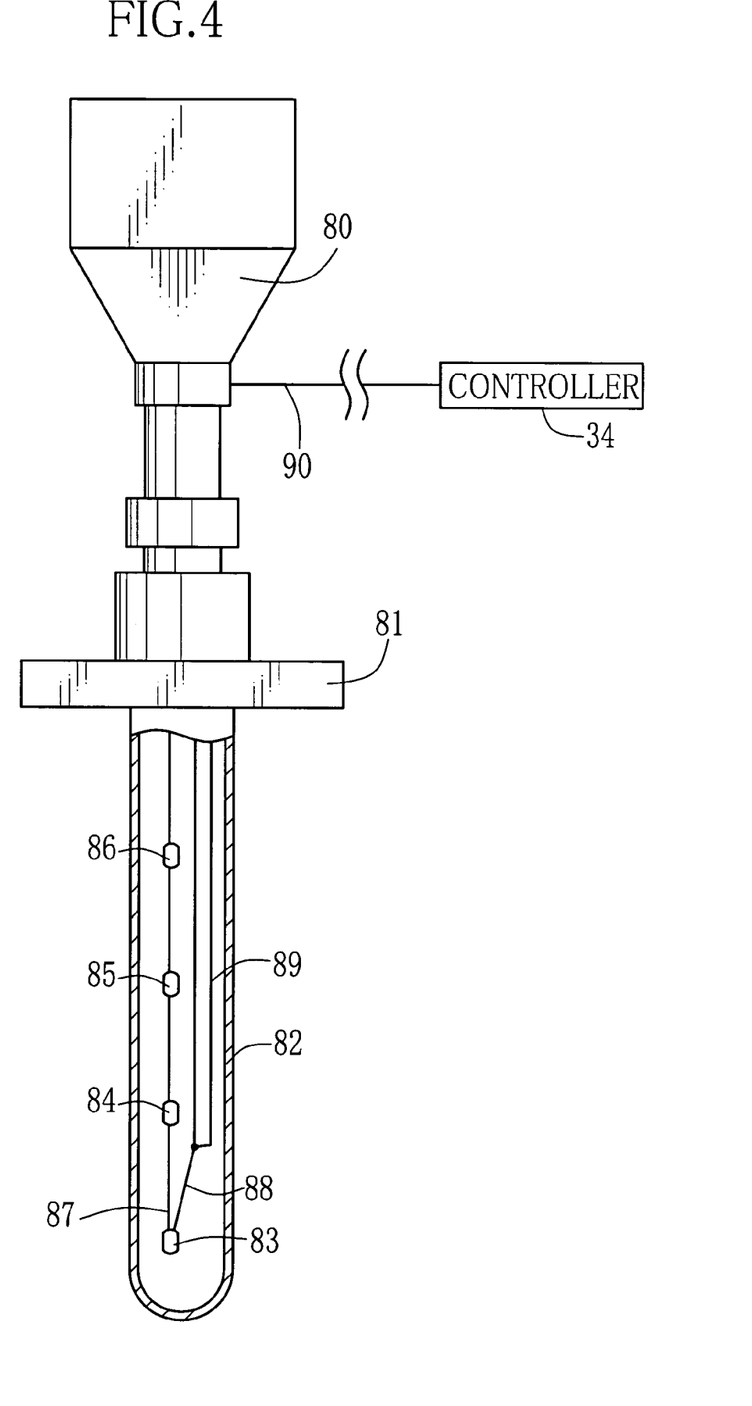
FIG. 4 is a sectional view of another embodiment of a thermometer used in FIG. 1.

In FIG. 4, a temperature gauge 80 is provided with a flange 81 for attachment to a pipe. In a protective pipe 82 of the temperature gauge 83, there are four elements 83-86 which are connected to three conductive wires 87-89 in three wire type. The conductive wires 87-89 are connected through a conductive wire 90 to the controller 34. In order to obtain the elements 83-86, an element which is usually used for a resistance temperature sensor is separated into four fragments. For example, a platinum element whose resistance is 100Ω at 0° C. is separated into four fragments, and these are used as the elements 83-86. Accordingly, each element 83-86 shows 25Ω at 0° C. In this structure, the averaged value of the temperatures measured by the elements 83-86 is obtained. Note that the temperature gauge 70, 80 in FIGS. 2-4 may be used instead of the temperature gauges 33, 37 in FIGS. 1-2. In the present invention, the configuration of the temperature gauge is not restricted especially, so far as the temperatures can be simultaneously measured at plural positions at least between an edge and a center in a cross-section of the pipe. Further, a method of attaching the temperature gauge is not restricted in the method with use of the flange. The attachment may be made with use of screws.

Figure 5:
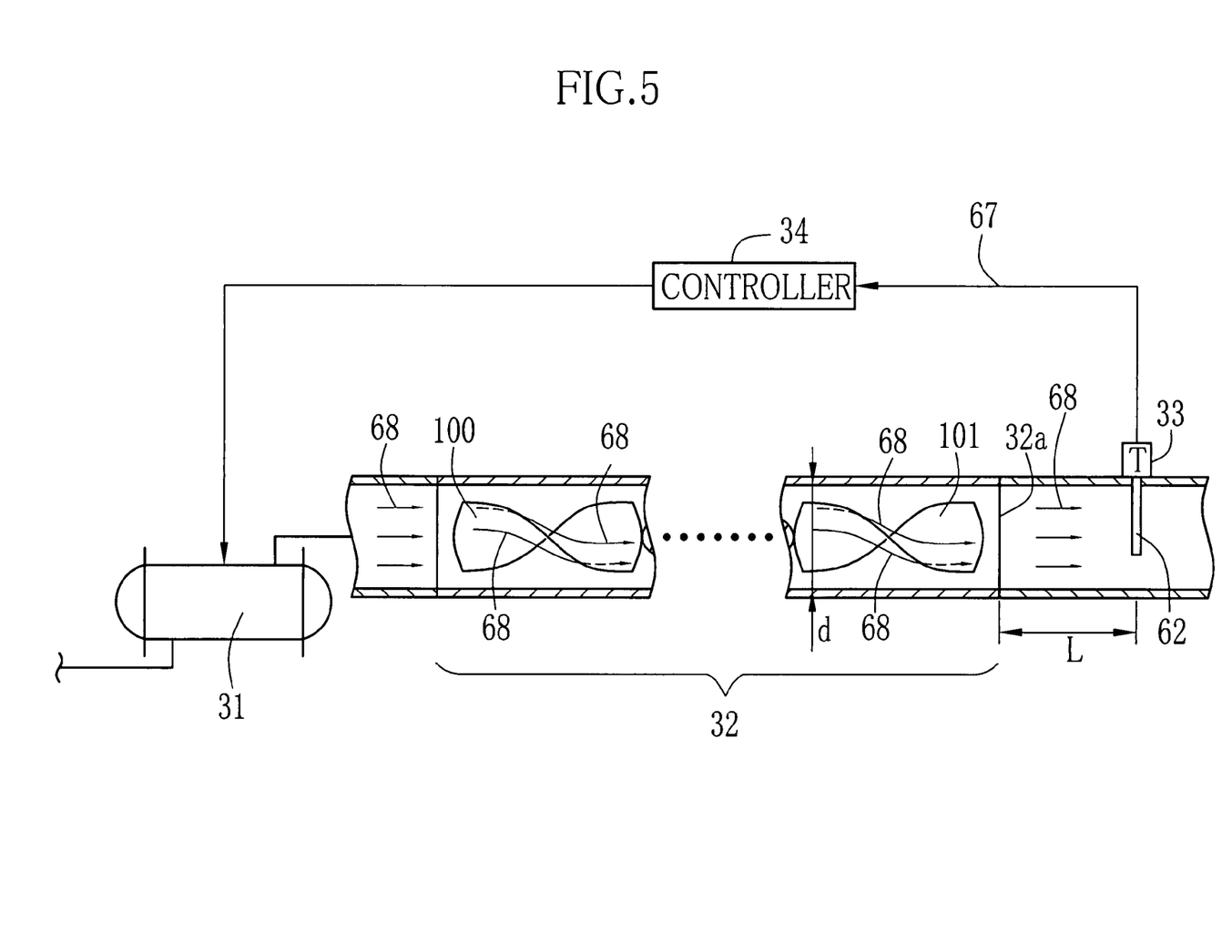
FIG. 5 is a partially exploded view of FIG. 1.

Explanations of the heat exchanger 31, the static mixer 32, and the temperature gauge 33 will be made in reference with FIG. 5. The dope 68 produced in the heat exchanger 31 is sent to the static mixer 32. The static mixer 32 includes many blades (or baffles) 100, 101. The blades 100, 101 change flux lines of the dope and make a dissolving solution. Thereafter, the temperature of the dope 68 is measured at plural positions by elements in the protective pipe 62 of the temperature gauge 33. The measured data of the temperatures are sent to the controller 34 through the conductive wires 67.

The controller 34 calculates the temperature distribution and average temperature of the dope 68. On the basis of the results of the calculation, it is determined whether the adjustment of the thermal transmission conditions will be made. When the adjustment is made, the flow rate and the temperature of the heating medium (not shown) of the heat exchanger 31 are adjusted. The measuring position of temperature of the dope 68 is preferably downstream from the static mixer 32 and near the exit 32a thereof. However, when the measuring position is too near the exit 32a, the dope sometimes flow unstably. Further the measuring position is too far from the exit 32a, the temperature varies during the feeding of the dope 68 downstream from the exit 32a. And the adjustment cannot be made strictly. Therefore, when an inner diameter of the heat exchanger 31 is d(mm), the length of attachment position of the protective pipe 62 from the exit 32a is L(mm) is preferably in the range of d(mm) to 10×d(mm).

In the present invention, when the halogenated hydrocarbons (for example, dichloromethane and the like) are used as a main solvent of the mixture solvent for producing the dope, it is preferable to adjust the dope such that the weight percentage of the solid materials such as the plasticizers, cellulose esters (TAC and the like) may be in the range of 15 wt. % to 35 wt. %. Further, the mixture solvent preferably contains at least dichloromethane, and further methanol, n-butanol and the like in the range of 5 wt. % to 25 wt. % to the total of the solvent.

In the present invention, when the esters (for example, methyl acetate and the like) are used as a main solvent of the mixture solvent for producing the dope, it is preferable to adjust the dope such that the weight percentage of the solid materials may be in the range of 18 wt. % to 35 wt. %. Further, the mixture solvent preferably contains at least methyl acetate, and further methanol, butanol and the like in the range of 5 wt. % to 30 wt. % to the total of the solvent.

Figure 6:
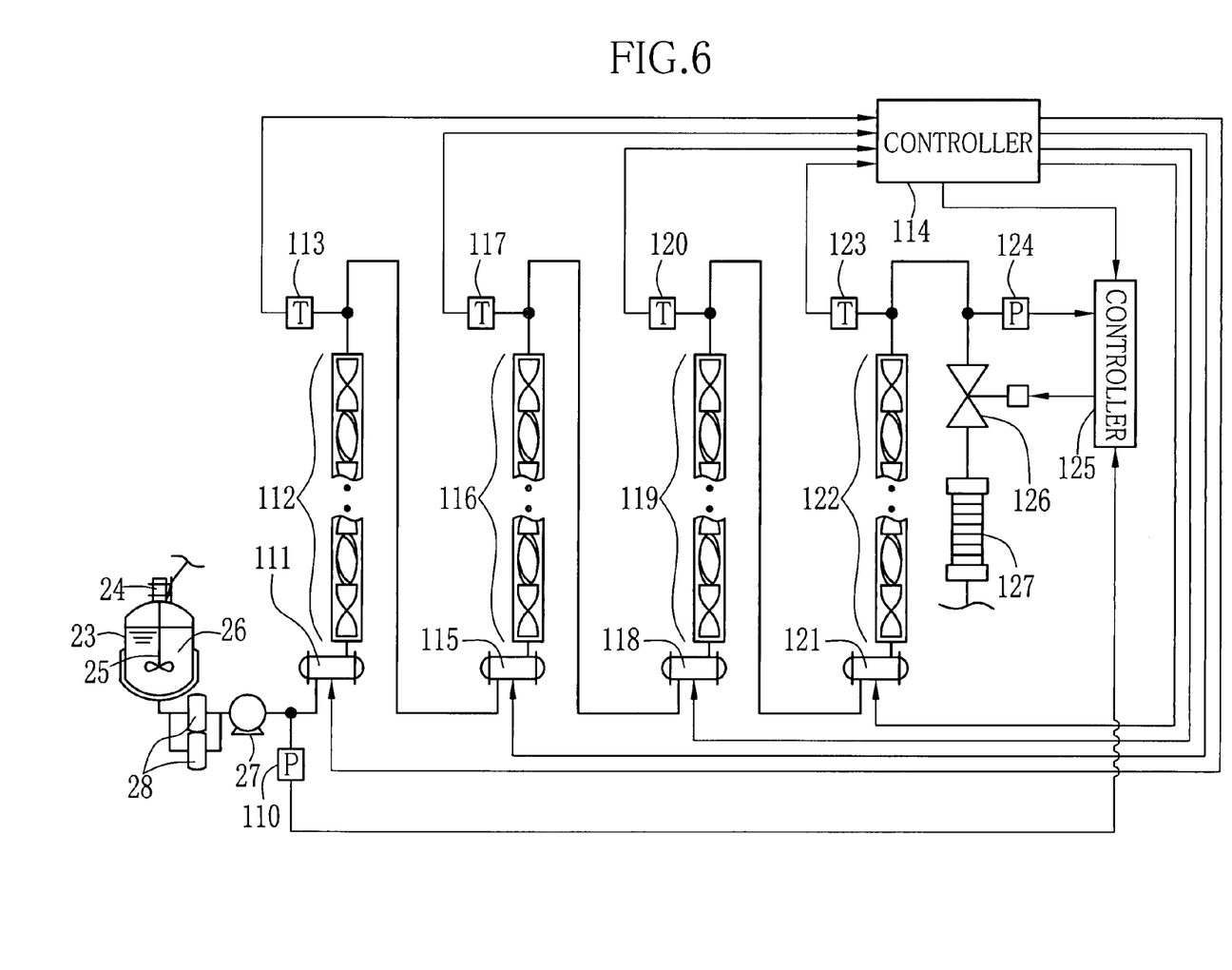
FIG. 6 is an explanatory view of another embodiment of the method of producing the dope.

An embodiment of the dope production line in which the plural heat exchangers for heating and cooling will be illustrated in FIG. 6. Note that the number and the explanation of the same members as in the dope production line 10 are omitted. Further, in view of reduction of the temperature distribution of the dope, it is especially preferable to apply this embodiment to the method of producing the dope, in which a spiral type heat exchanger is used. The dissolving solution 26 of the store tank 23 is fed to a first heat exchanger 111 by the pump 27 with measurement of the pressure by the pressure gauge. The solute such as the TAC and the like is dissolved to the solvent in the first heat exchanger 111. Thereafter, the mixture is fed to a static mixer 112 in which the mixture is mixed to be uniform. Thus the dope is obtained. The temperature of the dope is measured with the temperature gauge 113, and thereafter the dope is fed to a second heat exchanger 115.

The dope is further heated in the second heat exchanger 115. Thus the dissolution is progressed to obtain the dope adequate for the film production. Thereafter, the dope is fed to the static mixer 116 to make the mixing therein so as to be uniform. Further, the temperature of the dope fed out from the static mixer 116 is measured with the temperature gauge 117.

Thereafter, the dope is fed to the third heat exchanger 118 for cooling the dope. The dope is gradually cooled in flowing through the third heat exchanger 118, and thereafter fed to the static mixer 119. When the dope is partially cooled, the static mixer 119 mixes the dope to make the temperature uniform. Further, the temperature of the dope fed out from the static mixer 119 is measured by the temperature gauge 120, and thereafter fed to a fourth heat exchanger for cooling the dope.

The dope flows in the fourth heat exchanger 121 so as to be cooled to at most boiling point of the main solvent of the dope. Thereafter, the dope is mixed by the static mixer 122. After the dope is fed out from the static mixer 122, the temperature is measured by the temperature gauge 123. A pressure meter 124 is attached to a position at which the temperature of the dope becomes lower than the boiling point, and measures the temperature at the position. Thereafter, the dope is fed through a pressure controlling valve 126 to remove the impurities which are not dissolved in a dope production line in a filtration apparatus 127. Then the dope is fed to a dope tank (corresponding to the dope tank in FIG. 1).

As the temperature gauges 113, 117, 120, 123, the above described temperature gauges which can measure the temperatures at many points are used. Therefore the temperatures of the fed dope can be measured at the several points arranged in the cross-sectional direction of the pipe. Therefore the temperature distribution of the dope fed in the pipe is measured. The temperatures of the respective points are sent to the controller 114, in which the measured temperature distribution is compared to an allowable temperature distribution which is previously input. When the measured temperature distribution is not allowable, the controller 114 adjusts the flow rate and temperature of the heating medium of the first and second heat exchangers 111, 115 (respectively connected to the temperature gauges 113,117), and those of the cooling medium of the third and fourth heat exchangers 118, 121 (respectively connected to the temperature gauges 120,123).

Further, the feeding pressure of the dissolving solution measured by the pressure gauge 110 and the pressure of the dope measured by the pressure gauge 124 are sent to the controller 125. Further, the controller 114 outputs a data of the highest temperature T(° C.) of the dope. When the highest temperature T(° C.) is in the range of 60° C. to 150° C., the controller 125 controls the pressure regulating valve 126 to open and close such that the pressure P(MPa) of the produced dope may satisfy the following condition:

$$3.0(MPa) > P(MPa) \geq [P0 + (T-40) \times 0.002](MPa) \qquad (1)$$

wherein P0(MPa) is a theoretical value of the vapor pressure that is calculated from the highest temperature T(° C.) of the dope above the normal boiling point. Thus the pressure P(MPa) of the dope is made higher than the theoretical value of the vapor pressure P0(MPa), the generation of the bubbles in the dope is reduced.

As described above, when the plural heat exchangers for heating or cooling the dope is used, the change of the temperature caused by heating or cooling is in the range of 20° C. to 70° C. When the shift of the temperature is not in the range, the plural heat exchangers for heating or cooling the dope are connected in series. When the flow rate of the dope is in the range of 30 L/min to 200 L/min, each static mixer 112, 116, 119, 122 has a diameter of the pipe in the range of 50 mm to 300 mm and blades whose number is from 6 to 60. In the present invention, the static mixers 112, 116, 119, 122 are respectively provided downstream from the heat exchangers 111, 115, 118, 121, and used as heating or cooling units. Thus the dope whose temperature is adjusted is stirred soon, and therefore uniformly heated and cooled. Accordingly, the temperature distribution of the dope fed in the pipe becomes smaller.

Figure 7:
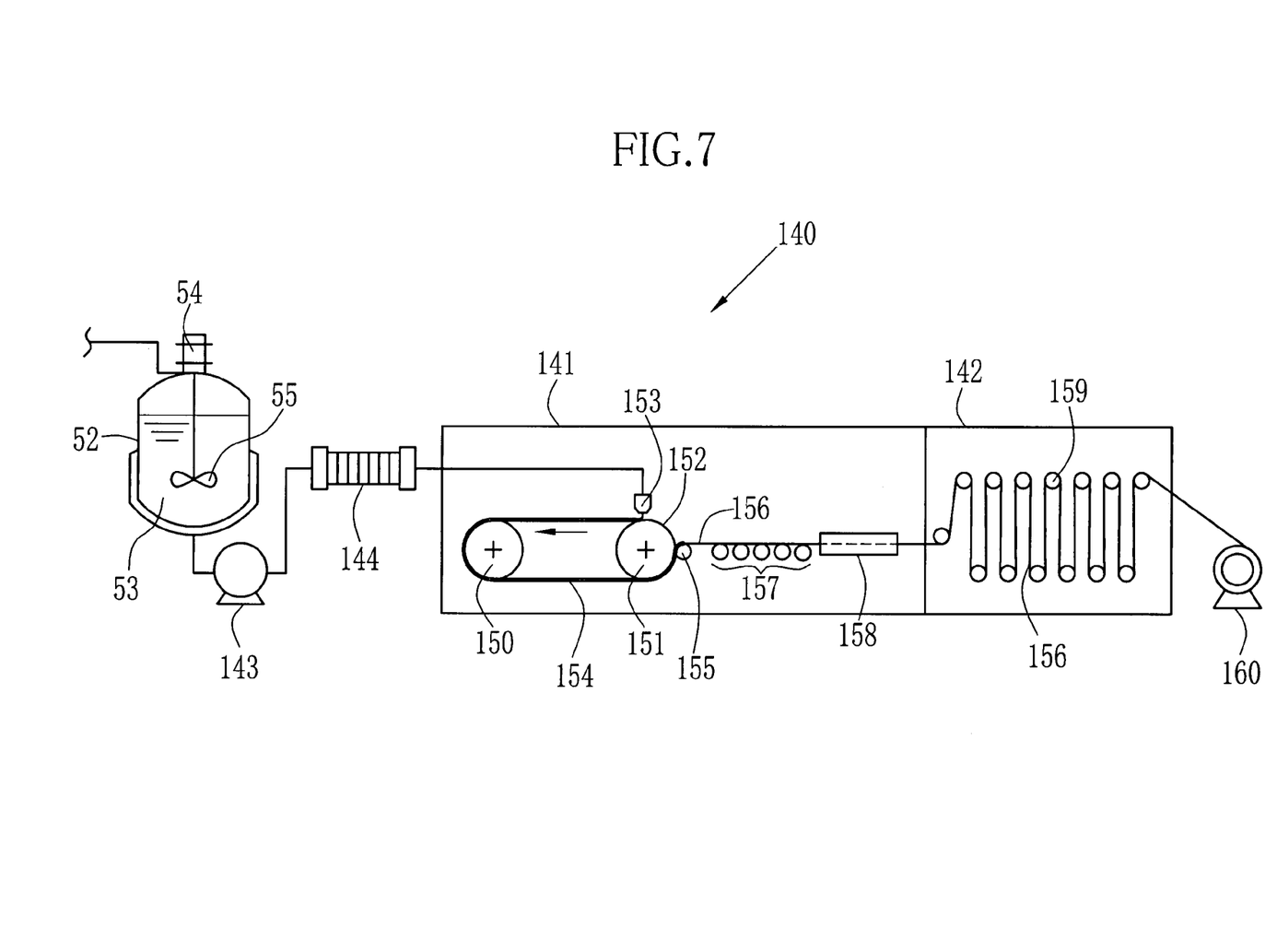
FIG. 7 is an explanatory view illustrating an embodiment of a solution casting method.

As shown in FIG. 7, a film production apparatus 140 is constructed of a belt zone 141 and a drying zone 142. The dope tank 52 is connected through a pump 143 and a filtrating apparatus 144 to the film production apparatus 140. The stirrer 55 rotates to stir the refined dope 53. Thus the refined dope 53 is made uniform.

In an endless belt zone 141 a belt 152 is provided with support by drums 150, 151. When the drums 150, 151 are rotated by a driving device (not shown), The belts 152 cyclically moves. Above the belt 152, a casting die 153 is provided. The refined dope 53 is fed from the dope tank 52 by the pump 143, and after the impurities are removed by the filtrating apparatus 144, the casting die 153 is fed. Note that the width of casting is preferably at least 2000 mm, and particularly at least 1400 mm. After a casting film 154 is gradually dried to have a self-supporting properties, the casting film 154 is peeled as a film 156 from the belt 152. The endless belt 152 is preferably formed of stainless, cupper and the like. Instead of the belt 152 may be used a rotary drum as a substrate. The rotary drum is formed of a stainless or iron. And preferably the hard chromium plating is made to the rotary drum. However, the material is not restricted in them.

The film 156 is transported to a tenter dryer 158 by rollers 157. Thereby, the rollers in downstream side are rotated at a higher speed such that a tension is applied in the transporting direction. The tenter dryer 158 dries the film 156 with keeping both side edge portions of the film to tense the film in a widthwise direction. When the tension is applied at least one of the widthwise direction or the transporting direction to stretch the film 156, a film surface on which wrinkles and creases occur is reformed.

The film 156 is transported into the drying zone 142 in which many rollers 159 are provided. In the drying zone 142, the film 156 is transported with sequentially contacting to the rollers 159. Note that in order to transport the film 156 to the drying zone 142, the transport is made with use of the rollers 157 or the tenter dryer 158. However, as shown in FIG. 7, it is preferable to simultaneously use both of them. In this case, the direction of the tension force is selected. Finally, the film 156 is wound by a winding apparatus 160. As being produced from the extremely uniform dope, the film 156 is preferably used a film base for a photosensitive materials, for an optical compensation sheet, as a protective film for the polarizing filter and the like. (The polarizing filter and the optical compensation sheet are used in the liquid crystal display). Further, the present invention is especially effective when the width of the film is in the range of 800 mm to 1800 mm. However, the present invention is also effective when the width is more than 1800 mm.

In the film production apparatus 140 in FIG. 7, the casting die 153 for single layer casting is used. However, the method of producing the film of the present invention is not restricted in the single layer casting, and may be a co-casting or a sequential casting. In the co-casting, a feed block is provided in the upstream side of the casting die or the casting die having a manifold is used. In the sequential casting, the plural dopes are sequentially cast. Further, it is preferable that at least one of the dopes may be the dope produced in the dope production method in the present invention. The dopes for forming the outermost layers is preferably produced in the dope production method in the present invention.

Figure 8:
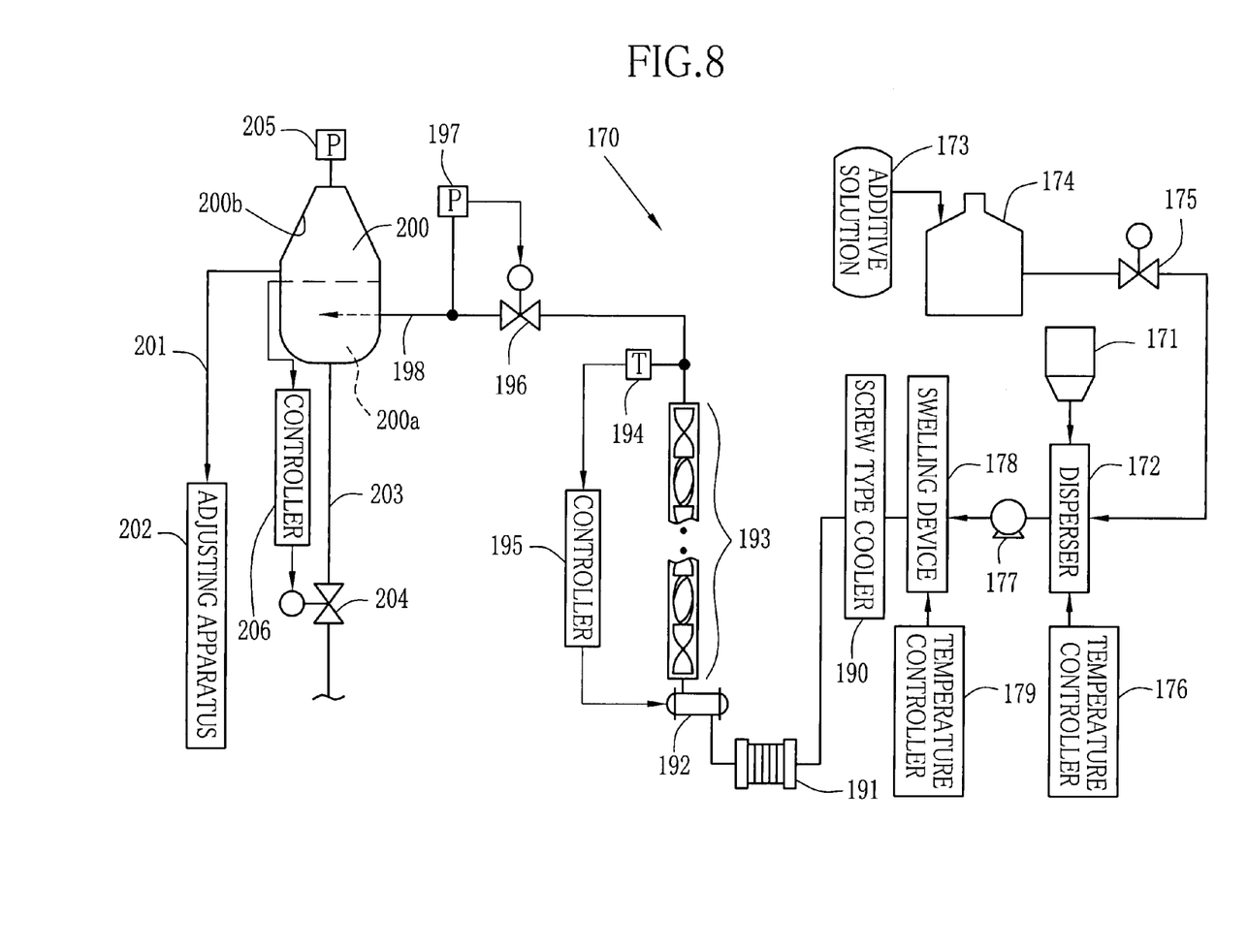
FIG. 8 is an explanatory view illustrating an embodiment of the method of producing the dope.

Further, another embodiment of the method of producing the dope of the present invention will be explained with reference to a dope production line 170 in FIG. 8. The polymer (for example TAC) in a hopper 171 is supplied into a disperser 172. The additives are dissolved to a solvent to prepare an additive solution 173. The solvent is contained in a tank 174. The solvent is methyl acetate type mixture solvent (hereinafter methyl acetate type solvent) without dichloromethane. The the methyl acetate solvent contains methyl acetate as the main solvent, alcohols (for example, methanol, n-butanol and the like) and ketones (for example acetones and the like) as sub-solvents.

After the additive solution 173 is added to the methyl acetate type solvent, a valve 175 is opened and closed to feed the methyl acetate type solvent to the disperser 172 to which a temperature controller 176 is attached. The temperature controller 176 cools inside of the disperser 172 from 15° C. to 30° C. In the disperser 172, the polymer is dispersed in the methyl acetate type solvent to obtain a dispersion, which is fed to a swelling device 178 by driving a pump 177. In the swelling device 178, the polymer is swollen in the methyl acetate solvent to obtain the swelling solution. Note that a temperature controller 179 is attached to the swelling device 178, so as to control the temperature thereof.

The swelling solution is fed to the cooler 190 and then stirred and mixed therein to dissolve the polymer to the solvent moreover with the rotation of the screw. Thus the dope is obtained. The methyl acetate type solvent has a merit in containing no halogenated hydrocarbons which have large influences on the circumstance. However, such solvent has demerits in the lower solubility of the polymer, especially TAC. Accordingly, the low concentration dope is usually prepared at first, and then the condensation thereof is made to produce the high concentration dope whose concentration is adequate for the casting.

The low concentration dope is prepared in the cool-dissolving method, and therefore the temperature is made higher in order to condense the low concentration dope. The low concentration dope is fed to a filtrating apparatus 191 to remove undissolved materials, and thereafter heated by a heat exchanger 192 as a heater. Note that the heater is not restricted in the heat exchanger 192. As the heat exchanger 192, a spiral type heat exchanger is particularly preferably used. The heat exchanger 192 heats the low concentration dope, such that the temperature may be from 20° C. to 60° C. higher. Thereafter, the low concentration dope is stirred by a static mixer 193 as mixing device such that the concentration may be uniform. Note that the mixing device is not restricted in the static mixer.

The temperature of the low concentration dope fed out from the mixing device 193 is measured by a temperature gauge 194. The measurement of the temperature is preferably made with a device having the same structure as the temperature gauges 33, 70, 80 (FIGS. 2-4) which can measure temperatures at many measuring points. A data of the measured temperature is sent to a controller 195, which determines whether the temperature of the low concentration dope is adequate for the condensation. When the temperature is not adequate, the controller 195 sends a controlling signal to the heat exchanger 192, which controls the temperature according to the controlling signal. When the spiral type heat exchanger is used as the heat exchanger 192, the conditions of the heat transmitting medium, such as a temperature and a feed rate, are changed.

The low concentration dope is fed through the pressure controlling valve 196, and then the pressure gauge 197 measures the pressure of the low concentration dope. When the pressure is less than the value necessary for the condensation, a controller (not shown) in the pressure meter sends a signal to the pressure controlling valve 196. According to the signal, the pressure controlling valve 196 is opened and closed such that the pressure may become to the predetermined value. The low concentration dope having the predetermined temperature and pressure is sent through a pipe 198 to a flash-evaporating apparatus 200 as a condensing apparatus. The condensing apparatus is not restricted especially. However, it is preferably a flash-evaporating apparatus described in Japanese Patent Laid-Open Publications No. 2002-230362 and 2002-230363. In the flash-evaporating apparatus 200, the dope is retained, and the low concentration dope fed from the pipe 198 into the accumulated dope. Thereby part of the solvent is evaporated to generate a solvent vapor. The flash-evaporation device has a condensing section 200b having inner walls which is cooled to condense the solvent vapor. The liquidized solvent is discharged through a pipe 201 to the outside and fed to an adjusting apparatus 202 for adjusting the concentration. After the adjustment, the liquidized solvent is reused as a solvent for production of the dope.

The dope retained in a main body 200a of the flash-evaporating apparatus 200 is condensed, and therefore part of the dope that is lower side of the main body has high concentration, and discharged out as the high concentration dope through a pipe 203. In order to control the flow rate of the discharged high concentration dope, a valve 204 is provided. Further, the flash-evaporating apparatus 200 regulates the evaporation rate of the solvent by in and decreasing the pressure. Therefore a pressure gauge 205 for measuring the pressure in the flash-evaporating apparatus 200 is provided. The data of the pressure measured by the pressure gauge 205 is sent to a controller 206 which discriminate whether the pressure value is adequate. On the basis of the discrimination, the valve 204 is preferably opened and closed. The high concentration dope obtained in this method is used as the dope for the casting with use of the film production apparatus 140 illustrated in FIG. 7.

EXAMPLE 1

Example 1 of the dope producing method of the present invention was made. The dope was produced in the dope production line 10 in FIG. 1. The solvent was the dichloromethane type mixture solvent in which the dichloromethane and mixture alcohol (mixture ratio, methanol:n-butanol=34:1) were mixed in the weight ratio of 83:17. Further, the acetylation percentage of TAC was 60%. The plasticizer was the mixture of TPP and BDP in ratio of 2:1 in weight. The solvent, TAC and the plasiciser were supplied in ratio of 77.8 wt. %, 20.0 wt. %, 2.2 wt. % into the dissolution tank 12. The motor 20 was driven to generate such a 45 kW stirring power that the rotation number of the stirrer might be 80 rpm. Thus the rotation was made for 30 minutes to obtain the dissolving solution. Further., the store tank 23 contains the dope previously prepared. As each heat exchanger 31, 35, a spiral type heat exchanger (produced by Kurose Chemical Equipment Co., Ltd.) is used. Further, the static mixer 32 has a diameter d of 150 mm and 18 blades. The static mixer 36 has a diameter d of 150 mm and 6 blades. Furthermore, the positions for attachment of the temperature gauges 33, 37 were 500 mm lower than the respective static mixers 32, 36. The structure of each temperature gauge was the same as in FIG. 2.

In the preparation of the dissolving solution 22, the dope in the store tank 23 was fed to the heat exchanger 31 for heating and the heat-exchanger 35 for cooling. Then the temperature of the dope was measured at four points of each temperature gauge 33, 37, and the temperature control was made such that the temperature of the dope might be 85° C. in the heat exchanger 31 and 35° C. in the heat exchanger 35. When the volume of the dope in the store tank 23 is lower than the predetermined value, the prepared dissolving solution was supplied into the store tank 23. The pump 27 was driven to feed the dissolving solution at the flow rate of 75 L/min. The pressure gauge 30 measures the pressure of the flowing dissolving solution, and the measured value was 1.8 MPa. The temperature of the dissolving solution 22 was increased to the 85° C. in the heat exchanger 31, and thereafter the mixing thereof was made in the static mixer 32 the situation of high temperature was kept for 10 minutes, the temperature of the dissolving solution 22 was decreased to 35° C., and thereafter the mixing was made in the static mixer 36. The highest temperature T of the heated dope was 130° C. Note that the highest temperature T was the highest temperature of the heat transmissionring surface of the heat exchanger 31. The theoretical evaporation value P0 (MPa) at the highest temperature T was calculated, and it was 1.0 MPa. Accordingly, the pressure of the dope was measured with the pressure gauge 38, and the pressure adjusting valve 39 was opened and closed such that the measured pressure P may be 1.2 MPa. Then the dope was fed to the filtrating apparatus 51 (the filter material was cellulose), and the undissolved particles were removed. Thereafter the dope was supplied into the dope tank 52. The particle size distribution analysis was made to measure the diameters of the particles remaining in the dope. The results of the measurement teaches that the remaining particles have no particle peaks corresponding to the large particles, and therefore the obtained dope had high quality. Note that the filter material was usable after the dope was continuously prepared for three days.

Then the film was produced with use of the film producing apparatus 140 in FIG. 7. The pump 143 is driven to cast the refined dope 53 from the casting die 153 on the belt 152 to form the casting film 154, such that the film 156 after the drying process may have a film thickness of 80 μm. When the casting film 154 had self-supporting properties on the belt 152, the casting film 154 was peeled from the belt 152 with support of a peeling roller 155. The rotation speed of the roller 157 is adjusted so as to draw the film 156 in the range of 1% to 4% in the transporting direction. Thereafter, the film 156 was transported in the tenter dryer 158 in which the temperature was kept in the range of 100° C. to 110° C. The film 156 was transported in the tenter dryer for 0.5 minutes, to proceed the drying. Note that the film was drawn from 5% to 6% in the widthwise direction. Thereafter, the film 156 was transported into a drying zone 142 in which the temperature was controlled in the range of 100° C. to 135° C. The film 156 was transported with guide of rollers for 15 minutes in the drying zone 142, and wound by the winding apparatus 160.

The retardation Re on surface and the retardation (Rth) in thickness of the film 156 to a light of 632.8 nm wavelength was measured with an ellipsometer. The retardations Re and Rth were 2 nm and 47 nm-48 nm, respectively.

The comparative experiment was made in the following order. The static mixers 32,36 were removed from the dope production line 10, and the connection of the temperature gauges 33,37 of four measurement points to a controller was broken. Instead of the temperature gauges 33,37, temperature gauges for one point measurement of the prior art were respectively disposed downstream from the heat exchangers 31,35. In this variation of the dope production line was produced a dope. Other conditions were the same as in Example 1. While the preparation of the dissolving solution 22 was made, the dope was fed into the store tank 23, and the temperatures of the heat exchangers 31, 35 were respectively controlled so as to be 85° C. and 35° C. In this case, however, when the temperatures were measured with use of the temperature gauges of four measurement point, the temperature distribution downstream from the heat exchanger 31 was from 60° C. to 100° C., and that from the heat exchanger was 25° C. to 50° C. The temperature distribution did not become smaller after the feeding of the dope for 60 minutes.

The production of the dope from the dissolving solution 22 was made in the same manners as in Example 1. As a windage remains in the dope having the temperature distribution, the dope could not be obtained at the uniform temperature. Further, the particle size distribution analysis of the obtained dope was made, and the gel-like materials were observed in the dope. The gel-like materials were removed by the filtrating apparatus 51. However, the filtration pressure became too large, and the filter material became unusable after use for one day long.

EXAMPLE 2

In order to produce the dope of Example 2, the following materials were used.

| | |
|---|---|
| Cellulose triacetate (Powder; degree of substitution, 2.82; viscometric average degree of polymerization, 320; moisture content, 0.4 wt. %; viscosity of 6% by mass of dichloromethane solution, 305 mPa · s; averaged particle diameter, 1.5 mm; standard deviation, 0.5 mm.) (Solvent) | 14.5 pts. wt. |
| Methyl acetate | 67.69 pts. wt. |
| Acetone | 10 pts. wt. |
| Acetone | 6.69 pts. wt. |
| Ethanol | 5.85 pts. wt. |
| n-butanol | 3.34 pts. wt |
| Plasticizer A (ditrimethylolpropanetetraacetate) | 0.29 pts. wt. |
| Plasticizer B (Triphenyl phosphate) | 0.91 pts. wt. |
| Plasticizer C (biphenyldiphenylphosphate) | 0.54 pts. wt. |
| Plasticizer D (ethylphthalylgrycol ethylester) | 0.091 pts. wt. |
| UV-absorbing agent a (2,4-bis-(n-octylthio)-6-(4-hydroxy-3,5-di-tert-butylanylino)-1,3,5-triazine) | 0.05 pts. wt. |
| UV-absorbing agent b (2-(2'-hydroxy-3',5'-di-tert-butylphenyl)-5-chrolobenzotriazol) | 0.05 pts. wt. |
| UV-absorbing agent c (2-(2'-hydroxy-3',5'-di-tert-amilphenyl)-5-chrolobenzotriazol) | 0.1 pts. wt. |
| Ethyl citrate esters (release agent) | 0.03 pts. wt. |
| Particles (silica having diameter of 20 nm, and Mohrs hardness about 7) | 0.05 pts. wt. |

The production of the dope was produced in a dope production line 170. The additive solution 173 was prepared from the above materials, and added to the mixture solvent so as to obtain a pre-solution. The vacuum pump (not shown) aspirated such that the pressure in the disperser 172 might become to about −120 Pa, and the temperature controller 176 controls the temperature of the disperser 172 to 25° C. The TAC and the pre-solution were supplied into the disperser 172, and the TAC was dispersed in the dispersing solution.

The temperature controller 179 controls the temperature of the swelling device 178 to 40° C. In the swelling device 178 the dispersion was supplied, and swelling thereof was made. Thus the swelling solution was obtained. The swelling solution was fed to a cooler 190, and the low concentration dope was obtained in the cool-dissolving method. In the cool-dissolving method, the swelling solution is fed in a screw pomp (not shown) whose shaft center portion is heated. The periphery of the screw was cooled to −70° C., and the swelling solution passes in the screw pump for 10 minutes. Thus the low concentration dope was obtained. The polymer concentration in the low concentration dope was measured in absolute drying method, and the measured value thereof was 16.5 wt. %. Thereafter, the impurities were removed by the filtrating apparatus (filter material; Advantech 63). Then the low concentration dope was fed to the spiral type heat exchanger 192, whose temperature was set in the range of 35° C.±2° C. Further, the low concentration dope was fed to the static mixer 193, in which the mixing of the concentration was made. The static mixer 193 had inner diameter d of 125 mm and 42 blades. Further, the temperature of the low concentration dope was measured with the temperature gauge 194. The temperature of the dope was 25° C.±2° C.

After the low concentration dope was fed through the pressure controlling valve 196, the pressure of the low concentration dope was measured with a pressure gauge 197. On the basis of the data obtained in the measurement, the control of the valve is made such that the pressure may be 1.0 MPa. The low concentration dope was supplied through the flash pipe 198 into the flash tank as the flash-evaporating apparatus 200. In the condensation of the polymer, the evaporation speed of the solvent is adequately adjusted such that the concentration of the polymer in the dope may be 21.8 wt. %. Thus the high concentration dope was obtained, and discharged from the tank (not shown) through the pipe 203.

The dope is cast from the casting die 153 to produce the film in the same manner as in Example 1. The retardation (Rth) in the thickness direction of the obtained film was measured and the value thereof was 50 nm. The film obtained in Example 2 was excellent in optical properties. The reason therefore may be that the high concentration dope obtained in the condensation became uniform since the mixing was made enough by the static mixer 193 after increase of the temperature of the low concentration dope. Since the high concentration dope was cast, the orientation of the film might be reduced.

Note that the present invention may be applied to a solution producing method in which the solutes of poor solubility are dissolved to the solvent.

Various changes and modifications are possible in the present invention and may be understood to be within the present invention.

What is claimed is:

1. A method of producing a dope by dissolving a polymer into a solvent, comprising steps of:

heating a mixture of said polymer and said solvent with use of a heater;

mixing said heated mixture with use of a first mixing device to obtain said dope;

cooling said dope to at most a boiling point of said solvent under an atmospheric pressure with use of an cooler; and mixing said cooled dope with a second mixing device.

2. A method as defined in claim 1, further comprising steps of:
using plural heating units, each of which is constructed of said heater and said first mixing device, to repeat plural times the heating and the mixing before the cooling; and
increasing a temperature of said mixture in said each heater by 20° C. to 70° C.

3. A method as defined in claim 2, further comprising steps of:
using plural cooling units, each of which is constructed of said cooler and said second mixing device, to repeat plural times the cooling and the mixing; and
decreasing a temperature of said dope in said each cooler by 20° C. to 70° C.

4. A method as claimed in claim 3, further comprising steps of:
measuring a temperature of said dope by use of a temperature measuring device provided downstream from at least one of said first and second mixing devices;
controlling the temperature of at least one of said heater and said cooler on the basis of result of the temperature measurement.

5. A method as defined in claim 4, wherein said temperature measuring device is a resistance thermometer tube having plural measurement points.

6. A method as defined in claim 5, wherein when said temperature of said mixture is at most a boiling point of said solvent under said atmospheric pressure, a pressure adjusting device increases a pressure of said mixture.

7. A method as defined in claim 6, wherein a highest temperature T(° C.) of said each temperature measured with said temperature measuring device is in the range of 60° C. to 150° C., and wherein when a theoretical value P0 of a vapor pressure of said solvent is calculated from said highest temperature T(° C.), a pressure P(MPa) of said dope satisfies a following condition; 3.0MPa>P(MPa)≧[P0+(T-40)×0.002](MPa).

8. A method as defined in claim 4, wherein said cooler is another heat exchanger.

9. A method as defined in claim 8, wherein said heat exchangers are spiral type heat exchangers.

10. A method as defined in claim 9, wherein said first and second mixing devices are static mixers, each of which has a diameter in the range of 50 mm to 300 mm and includes 6 to 60 blades.

11. A method as defined in claim 10, wherein a flow rate of said dope is in the range of 30 L/min to 200 L/min.

12. A method as defined in claim 11, wherein a concentration of said polymer to be cooled is in the range of 0.1 wt.% to 25.0 wt.%.

13. A method as defined in claim 12, wherein said polymer is cellulose ester.

14. A method as defined in claim 13, wherein said cellulose ester is cellulose acetate having an averaged acetylation degree in the range of 57.5% to 62.5%.

15. A method as defined in claim 14, wherein a plasticiser in the range of 0.1 wt.% to 20.0 wt.% to said polymer is added to said mixture or said dope.

16. A method as defined in claim 15, wherein said solvent is a mixture solvent whose main solvent is a halogenated hydrocarbon.

17. A method of producing a dope by dissolving a polymer into a solvent, comprising steps of:
cooling a mixture of said polymer and said solvent to at most a boiling point of said solvent under an atmospheric pressure with use of a cooler; and
mixing said cooled mixture with use of a mixing device.

18. A method as defined in claim 1, wherein said dope is cast onto a continuously moving substrate to form a film.

19. An apparatus for producing a dope by dissolving a polymer into a solvent, comprising:
a heat exchanger for heating a mixture of said polymer and said solvent;
a mixing device for mixing said heated mixture to obtain said dope.

20. An apparatus as defined in claim 19, wherein said heat exchanger is a spiral heat exchanger.

21. An apparatus as defined in claim 20, wherein said mixing device is a static mixer which has a diameter in the range of 50 mm to 300 mm and includes 6 to 60 blades.

22. A method as defined in claim 7, wherein said heater is a heat exchanger.

* * * * *